United States Patent [19]

Lee et al.

[11] Patent Number: 4,972,008
[45] Date of Patent: Nov. 20, 1990

[54] PROCESS FOR PREPARING A LOW STRESS AGENT & AN EPOXY COMPOSITION CONTAINING THE AGENT

[75] Inventors: Jung D. Lee; Chang J. Yoo; Moon Y. Lee, all of Soowon, Rep. of Korea

[73] Assignee: Korea Chemical Co., Ltd., Rep. of Korea

[21] Appl. No.: 275,561

[22] Filed: Nov. 23, 1988

[30] Foreign Application Priority Data

Nov. 25, 1987 [KR] Rep. of Korea .......................... 13310

[51] Int. Cl.$^5$ .......................... C08K 9/06; C08L 63/00
[52] U.S. Cl. ...................................... 523/203; 523/205; 523/206; 523/209; 523/400; 523/457; 523/466; 524/437; 524/445; 524/451
[58] Field of Search ............... 523/203, 205, 206, 209, 523/400, 466; 428/405; 524/437, 445

[56] References Cited

U.S. PATENT DOCUMENTS

| | | | |
|---|---|---|---|
| 4,071,494 | 1/1978 | Gaylord | 523/205 |
| 4,425,384 | 1/1984 | Brownscombe | 523/205 |
| 4,478,963 | 10/1984 | McGarry | 523/206 |
| 4,530,894 | 7/1985 | Imamura et al. | 428/405 |

*Primary Examiner*—Lewis T. Jacobs
*Attorney, Agent, or Firm*—Lowe, Price, LeBlanc, Becker & Shur

[57] ABSTRACT

A low stress agent which increases the coherence of organic materials and an inorganic filler, decreases the modulus in molded articles which absorb stress and impact energy is prepared by a process which comprises preparing a silane-modified reactive liquid polymer from a silane coupling agent and a reactive liquid polymer containing functional groups or double bonds, treating the surface of an inorganic filler with a silane coupling agent, and reacting said silane modified reactive liquid polymer with said treated inorganic filler. An epoxy resin or phenol resin composition which contains the low stress agent is very suitable for use in encapsulating a semiconductor.

10 Claims, 2 Drawing Sheets

PROCESS FOR PREPARING A LOW STRESS AGENT & AN EPOXY COMPOSITION CONTAINING THE AGENT

BACKGROUND OF THE INVENTION

1. Field of the Invention

The present invention relates to a process for preparing a low stress agent coated with rubber and an epoxy composition containing the low stress agent. When used in semiconductor encapsulants, the low stress agent absorbs inner and outer stresses in a molded article of organic composite materials and exhibits higher reliability.

2. Description of the Prior Art

For preparing the compounds for use in semiconductor encapsulants, a mixture of organic materials such as epoxy resins and inorganic fillers has been used to produce a molding compound having desired properties such as electric insulation and moldability at a reasonable level.

However, as semiconductor devices are integrated in a very large-scale, as the sizes of semiconductor chips become larger and smaller and as the size of memory cells becomes smaller, it is required in the art to modify such compounds so that they have improved characteristics.

In the prior art, an inorganic filler treated with a coupling agent has been used in compounds as shown in Japanese Patent Publications Nos. 61-78823 and 61-136548. This method made the cured article i.e., the molded article made by encapsulating a semiconductor device with the compound, highly water resistant, but an increase in modulus of the cured article caused by the coupling agent led to an increase in inner stress, which causes a problem in that the ratio of crack occurrence on the layer of the semiconductor devices becomes higher due to thermal shock.

These are known methods such as blending or reacting rubber in compounds as shown in Japanese Patent Publications Nos. 61-62514, 61-133225 and 61-148227 to improve the physical properties of organic materials in the compounds, i.e., epoxy resin or phenol resin. However, there are many problems in the molding process since the rubber bleeds out during molding treatment and as a result of this, may stain the mold. In order to prevent the above mentioned bleeding out, there are other types of methods, such as addition of reactive liquid polymer as shown in Japanese Patent Publications Nos. 61-148227 and 61-26671 or reacting to synthetic rubbers, silica and silane coupling agents as shown in Japanese Patent Laid-Open Publication No. 60-188418. However, the former causes a problem such as lowering of a second glass transition temperature and the hardness of the curing article, while the latter fails to decrease the modulus.

SUMMARY OF THE INVENTION

The present invention relates to a process for preparing a low stress agent by reacting inorganic filler the surface of which is treated with a silane coupling agent, and a reactive liquid polymer and a silane-modified reactive liquid polymer mixture so that the reactive liquid polymer is coated on said inorganic filler. Further, a process for preparing a low stress agent wherein the product of said process is additionally reacted with an epoxy resin or another resin, is included within the scope of the present invention.

Also, the present invention relates to an epoxy resin composition for use in encapsulating the semiconductor and which contains the low stress agent of the invention. The composition of the present invention increases a coherence of organic materials and inorganic filler, decreases modulus in molded articles, and as a result of this absorbs stress and impact energy.

DETAILED DESCRIPTION OF THE PREFERRED EMBODIMENT

Figure 1:
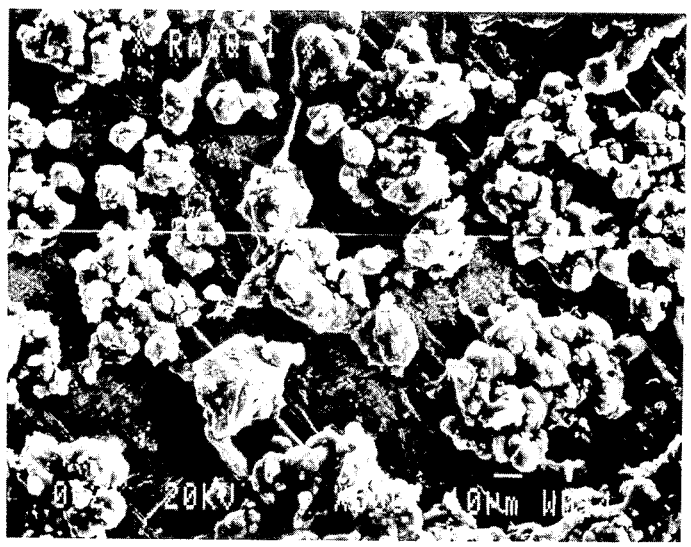
FIG. 1 (500 times magnification)
Figure 2:
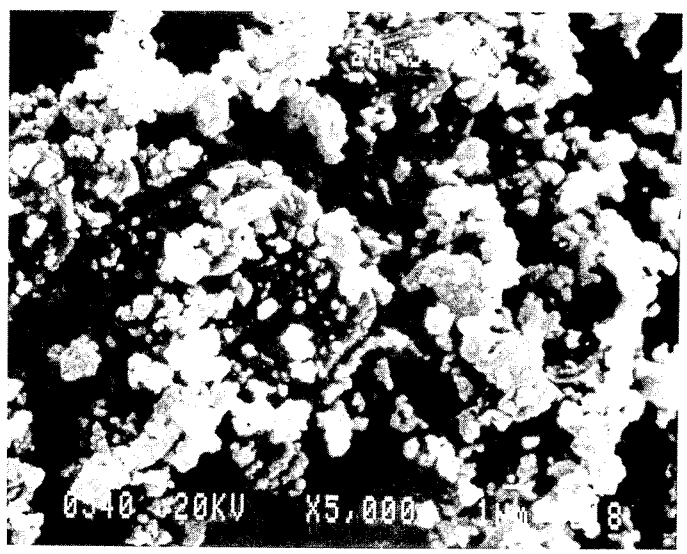
FIG. 2 (5000 times magnification) are enlarged perspective views of silica before the surface of the silica is coated with the reactive liquid polymer.
Figure 3:
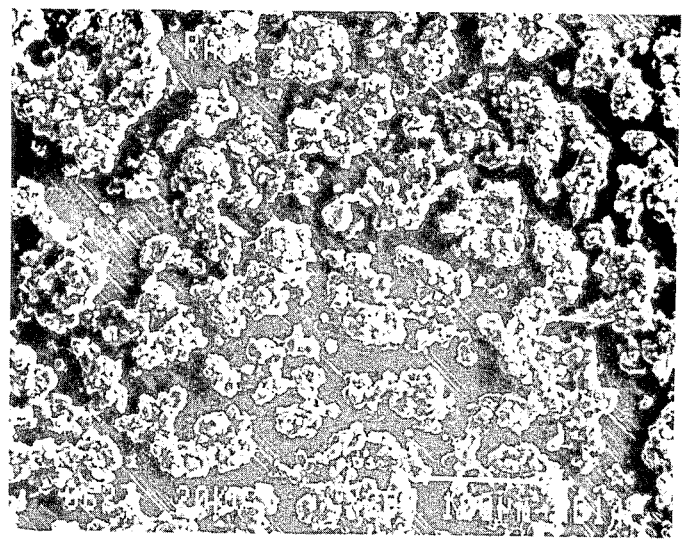
FIG. 3 (200 times magnification)
Figure 4:
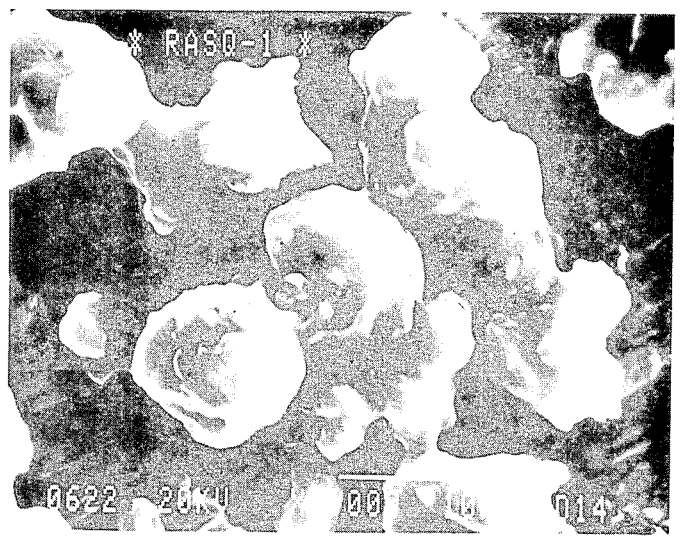
FIG. 4 (3000 times magnification) are enlarged perspective views of silica the surface of which has been coated with reactive liquid polymer and low stress agent.

The process according to the present invention comprises (a) the first step of preparing a silane-modified reactive liquid polymer from a reaction of a silane coupling agent with a reactive liquid polymer containing functional groups or double bonds; (b) the second step of treating the surface of an inorganic filler with the silane coupling agent; and (c) the third step of reacting said silane modified reactive liquid polymer with said inorganic filler prepared from the above steps (a) and (b) to cause an additional reactive liquid polymer to be coated on the filler, and then reacting the product with epoxy resins or phenol resins.

In order to prepare the silane-modified reactive liquid polymer of the step (a), there are many types of methods such as (i) vulcanizing a silane coupling agent having vinyl groups and a reactive liquid polymer containing double bonds within its molecule; (ii) reacting a silane coupling agent having an epoxy group with a reactive liquid polymer having carboxy groups or amino groups; and (iii) reacting a silane coupling agent having amino groups or mercapto groups with a reactive liquid polymer having epoxy groups.

The process for preparing the silane-modified reactive liquid polymer comprises reacting 40 parts of a silane coupling agent with 100 to 150 parts of a reactive liquid polymer containing double bonds or functional groups. When the method (i) is used, 0.5 to 1.5 parts of a vulcanizing agent is added to vulcanize at 120° C. to 150° C. for 0.5 to 1.5 hours. In this method, the silane coupling agent is selected from vinyl triethoxy silane, vinyl tri (2-methoxy ethoxy) silane and the like; the reactive liquid polymer having double bonds within its molecule is selected from butadiene, butadiene-acrylonitrile copolymer having a molecular weight of 1500 to 5000 such as the following formula (1) & (2); vulcanizing agents are selected from peroxides such as benzoyl peroxide, lauryl peroxide and tertbutyl perbenzoate, and oximes such as para-benzoquinone dioxime and p,p-dibenzoquinone dioxime.

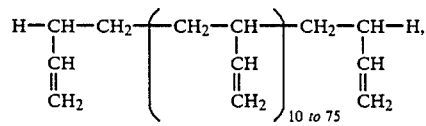

(1)

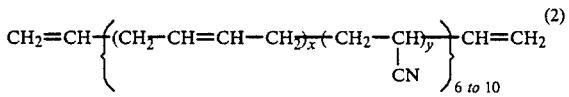

(2)

where x=5 to 6, y=0 to 5.

In method (ii), a coupling agent having epoxy groups is selected from β-(3,4-ethoxy cyclohexyl) ethyl trimethoxy silane, γ-glycidyloxy propyl triethoxy silane and the like; the reactive liquid polymer having carboxy groups is selected from butadiene, butadiene-acrylonitrile copolymer having a molecular weight of 1500 to 5000, and carboxy groups within its molecule or at its terminal such as the following formula (3).

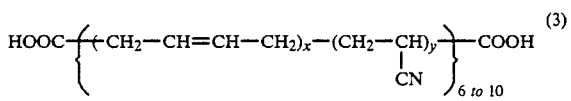

(3)

where x=5 to 6, y=0 to 5.

This reaction is continued at 120° C. to 170° C., preferably at 130° C. to 200° C., for 2 to 6 hours. The reaction is finished at an acid value of 0.5 or less. Catalysts such as tri-dimethyl amine methyl phenol, dimethyl aminomethyl phenol, tri ethylene tetraamine, ethanol diamine, ethylene diamine and benzyl dimethyl amine can be added for easily promoting the reaction. When butadiene or butadiene-acrylonitrile copolymer having amine groups within its molecule or at its terminal end, such as in the following formula (4), and a molecular weight of 1500 to 5000, the reaction comprises the same process as the above one except the reaction is finished at the point of deletion of the amine groups and the reaction is measured by the method disclosed in Industrial & Engineering Chemistry Vol. 48 No. 1.

In the above three reactions, organic functional groups of the silane coupling agent are reacted with functional groups or double bonds of the reactive liquid polymer to produce the silane-modified reactive liquid polymer and the modified reactive liquid polymer obtained is reacted with an inorganic filler having its surface treated with the coupling agent to cause the reactive liquid polymer to be coated thereon.

In the step of treating the surface of the inorganic filler with the silane coupling agent, first, an alkoxy group of the coupling agent is hydrolyzed with distilled water to produce a silanol group. A condensation reaction of the produced silanol group and a hydroxy group of the inorganic filler is derived by heating at 105° to 110° C. and also an interreaction among silanol groups can be created. In this process, the pH value can be adjusted with a known method. To easily dry the reaction product, the minimum quantity of distilled water needed for hydrolysis is added while alcohols such as isopropyl alcohol and ethanol can be added by 7 to 12 times. After the surface of the inorganic filler is treated with the silane coupling agent, the product is dried sufficiently until there is no water.

The inorganic filler is selected from calcined clay, alumina trihydrate, amorphous silica, fused silica, spherical silica, hydrous silica and talc and it is proper that 0.5 to 3.0 parts of coupling agent be used based on 100 parts inorganic filler.

In the silane system coupling agent, the amount of silane coupling agent used in the first step of preparing modified reactive liquid polymer must be used with care owing to differences in the absorption amounts. For example, when γ-methacryl oxy propyltriethoxy silane is absorbed into E-glass at about 0.5% by concentration, the maximum absorption amount is about 3 mmol/100 m², when γ-amino propyl triethoxy silane is absorbed at the same concentration, the maximum absorption amount is about 40 mmol/100 m², and for 3-(2,3-epoxy) propoxypropyl methoxy silane, the absorption amount is 80 mmol/100 m². But when an excess amount of coupling agent is used, stains appear in the molding process.

In the step of reacting said inorganic filler, the surface

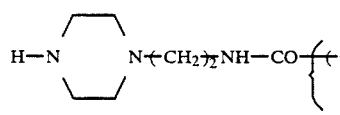 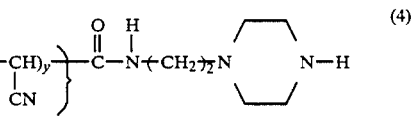

(4)

where x=5 to 6, y=0 to 5.

In method (iii), a coupling agent selected from γ-mercapto propyl trimethoxy silane, N-β-(amino methyl)-amino propyl triethoxy silane, and γ-amino propyl triethoxy silane etc. is reacted with pendant or terminated epoxy groups in butadiene or butadiene acrylonitrile copolymer, such as the following formula (5), having a molecular weight of 1500 to 5000, at 120° to 170° C. for 2 to 6 hours and the reaction is finished at the point of deletion of the epoxy groups in reactive liquid polymer.

of which is treated, with the silane-modified reactive liquid polymer to cause the inorganic filler to be coated with the reactive liquid polymer, 100 parts of the inorganic filler, the surface of which is treated with coupling agent, is uniformly mixed with 50 to 150 parts of the reactive liquid polymer at 100° to 150° C. 5 to 20 parts of the silane-modified reactive liquid polymer are added to the mixture with heating and stirring at 100° to 150° C. for 0.5 to 3 hours to cause the filler to be coated with the reactive liquid polymer. It is preferable that said additional reactive liquid polymer and the reactive

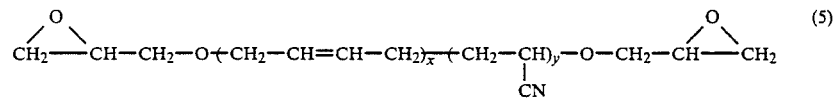

(5)

where x=5 to 6, y=0 to 5.

liquid polymer used for preparing the silane-modified reactive liquid polymer should be of the same kind. Also, in the process for preparing the silane coupling agent used for treating the surface of the inorganic filler the and silane-modified reactive liquid polymer, it is necessary that organic functional groups of the silane coupling agent be combined properly; for example, the inorganic filler, the surface of which is treated with an epoxy silane, can be reacted with an aminosilane-modified reactive liquid polymer or a mercapto silane-modified reactive liquid polymer; inorganic filler, the surface of which is treated with a mercapto silane or an aminosilane can be reacted with an epoxy silane-modified reactive liquid polymer; and inorganic filler, the surface of which is treated with a vinyl silane can be reacted with a vinyl silane-modified reactive liquid polymer. At this point, the reaction is finished and the reaction product can be used as a low stress agent for organic composite materials. However, in order to prevent bleed and stain problem which may be caused by the reactive liquid polymer during a molding process, it is preferably that 175 to 650 parts of epoxy resin or 150 to 650 parts of phenol resin should be reacted with the above reaction product.

The epoxy resins used in this reaction have an equivalent value of 180 to 550, and a softening point of 35° to 100° C.; the epoxy resins are selected from diglycidyl ether of bisphenol A, polyglycidyl ether of cresol formaldehyde novolac, polyglycidyl ether of phenol formaldehyde novolac, diglycidyl ether of hydrogenated bisphenol A, polyglycidyl ether of hydrogenated bisphenol A, polyglycidyl ether of hydrogenated phenol formaldehyde novolac and the phenol resin have a hydroxy equivalent value of 105 to 120, and a softening point of 80° to 110° C. The epoxy resins or phenol resins having ionic impurities such as potassium, sodium and chlorine at a concentration of 10 ppm or less, preferably 2 ppm or less, can be used, and in particular the epoxy resins have hydrolytic chlorine at a concentration of 400 ppm or less, preferably 200 ppm or less.

If the reactive liquid polymer has functional groups such as carboxy groups or amino groups, the reactive liquid polymer is reacted with epoxy resins, and a reactive liquid polymer having epoxy groups is reacted with phenol resins. When the inorganic filler, the surface of which is treated, is reacted with the reactive liquid polymer mixture containing the silane-modified reactive liquid polymer, 5 to 30 parts by weight per 100 parts of inorganic filler are coated, and when these reaction products are reacted with epoxy resins or phenol resins, the content is as much as the above. However, since unreacted rubber in the reaction products of the epoxy resins or phenol resins form a polymer interpenetrating network (IPN), which is composed of minute elastic bodies having a particle size of 0.1 to 5.0 μm, the bleed problem on the surface of materials in the molding process of the organic composite materials can be solved.

The low stress agent obtained from the above process is added to known synthetic resin compositions to produce the desired resin composition; particularly it can be used in an epoxy resin composition for use in encapsulating a semiconductor.

When the low stress agent of the present invention is used in the epoxy resin composition, 2 to 15% by weight of the low stress agent obtained by the process of reacting epoxy resins or phenol resins and 1 to 5 parts of the low stress agent obtained from reacting the inorganic filler, the surface of which is treated, with the reactive liquid polymer mixture are added in the epoxy resin composition separately or by mixing.

Since the low stress agent of the present invention has a good adhesion between organic materials and inorganic materials owing to a strong reaction of the silane coupling agent on the surface of the inorganic filler and the silane-modified reactive liquid polymer and has passed by way of coating, the external impact energy or inner stress of the molded article is easily absorbed and dispersed, and thereby a highly reliable semiconductor device can be manufactured.

The present invention will now be described in more detail in connection with the examples which should be considered as being exemplary.

EXAMPLE 1

(a) 135 parts of isopropyl alcohol are added into 15 parts of distilled water and liquid ammonia is added until the pH value is 12, and then 1 part of γ-amino propyl triethoxy silane is added. To the mixture, are added 300 parts of silica in gradual amounts while heating and stirring at 60° C. for 4 hours and the product is dried in a dryer under stirring at 110° C. for 3 hours to produce silica the surface of which is treated with silane. 45 parts of the silica obtained are added into 51 parts of butadiene-acrylonitrile copolymers (Hycar CTBN 1300×8 from Goodrich Co.) and dispersed uniformly at 150° C.

(b) When the acid value drops 1 point from the initial acid value, 47 parts of γ-glycydoxy propyl triethoxy silane are reacted with 130 parts of butadiene-acrylonitrile copolymers (Hycar CTBN 1300×8 from Goodrich Co.) at 120° C. for 4 hours to produce epoxy silane-modified reactive liquid polymer having an acid value of 0.3. 3 parts of the modified reactive liquid polymer are added to the product of the step (a) with heating and stirring at 150° C. for 2 hours to obtain the desired low stress agent.

EXAMPLE 2

A low stress agent was prepared by the method and composition according to EXAMPLE 1 except that 9 parts of the epoxy silane-modified reactive liquid polymer were used.

EXAMPLE 3

(a) 0.5 parts of vinyl triethoxy silane is added into a liquid mixture of 15 parts of distilled water and 135 parts of ethanol. To the mixture are added 100 parts of silica in gradual amounts under stirring at 150° C. for 6 hours and the product is dried in a dryer with heating and stirring at 110° C. to produce silica, the surface of which are treated with silane. 45 parts of the silica obtained is added into 51 parts of styrene-butadiene copolymers (Cariflex TR 1102) and dispersed uniformly at 150° C.

(b) 45 parts of vinyl triethoxy silane are reacted with 120 parts of styrene copolymers (Cariflex TR 1102) and 0.5 parts of benzoyl peroxide at 120° C. for 1 hour to produce a vinyl silane-modified reactive liquid polymer. 9 parts of the modified reactive liquid polymer obtained are added to the product of step (a) under stirring at 150° C. for 30 minutes and then to the above mixture are added 195 parts of cresolnovolac epoxy resin having an epoxy equivalent weight of 198 and a softening point of 85° C. at 150° C. for 2 hours to produce the desired low stress agent.

EXAMPLE 4

195 parts of cresolnovolac epoxy resin having an epoxy equivalent weight of 198 and a softening point of 85° C. are reacted with 150 parts of the product of the EXAMPLE 2 at 150° C. to obtain the desired low stress agent having an acid value of 0.1.

EXAMPLE 5

(a) 135 parts of methanol are added into 15 parts of distilled water and the pH value of said mixture is adjusted to 4 with acetic acid, and then 1 part of γ-glycidyloxyl propyl triethoxy silane is added. To the mixture, are added 100 parts of silica in gradual amounts under stirring at 60° C. for 4 hours and the products are dried in a dryer to produce silica, the surface of which is treated with silane. 40 parts of the silica obtained are added into 20 parts of butadiene-acrylonitrile copolymer reactive liquid polymer having an epoxy equivalent weight of 1620, and epoxy groups at its terminal with heating and stirring at 150° C. for 1 hour.

(b) 59 parts of γ-amino propyl triethoxy silane are reacted with 160 parts of a butadiene-acrylonitrile reactive liquid polymer having an epoxy equivalent weight of 1620, and epoxy groups at its terminal ends with heating and stirring at 140° C. for 3 hours to produce amino silane-modified reactive liquid polymer. 4 parts of the silane-modified reactive liquid polymer obtained are added to the product of the step (a) at 150° C. for 30 minutes, and then 96 parts of novolac phenol resin having a hydroxy equivalent weight of 106, and a softening point of 92° C. is reacted with said mixture at 150° C. for 3 hours to obtain the desired low stress agent.

COMPARATIVE EXAMPLE 1

The reaction product was prepared by the method and composition according to EXAMPLE 1 except the epoxy silane-modified reactive liquid polymer was not used.

COMPARATIVE EXAMPLE 2

The reaction product was prepared by the method and composition according to EXAMPLE 4 except the silane-modified reactive liquid polymer was not used.

COMPARATIVE EXAMPLE 3

The reaction product was prepared by the method and composition according to EXAMPLE 5 except the amino silane-modified reactive liquid polymer was not used.

COMPARATIVE EXAMPLE 4

51 parts of Hycar CTBN 1300×8 are added to 195 parts of cresol novolac epoxy resin having an epoxy equivalent weight of 198, and a softening point of 85° C. with heating and stirring at 150° C. for 3 hours to obtain the reaction product.

For compositions in accordance with the EXAMPLES and COMPARATIVE EXAMPLES, the measured amounts of reactive liquid polymer coating to be coated on the surface of silica are in Table (1). However, when the silane-modified reactive liquid polymer was not used, the surface of silica had no reactive liquid polymer coating.

THE MENSURATION OF AMOUNT OF REACTIVE LIQUID POLYMER COATING 3 g of the composition obtained from the EXAMPLES and COMPARATIVE EXAMPLES respectively are added into 50 g of xylene and the solubles of said mixture are entirely removed by heating, soluting and filtering three times repeatedly, and remaining solvent is volatilized in a dryer operated by circulating hot air at 150° C. The dried product is weighed in a melting pot and ignited at high temperature in an electric furnace at 1000° C. to incinerate organic materials contained in the product.

The formula for calculation of rubber coating is as follow:

$$\text{Amount of rubber coating \%} = \frac{\text{Weight of pure rubber coated on surface of the silica}}{\text{Weight of pure silica}} \times 100$$

$$= \frac{A - B}{B} \times 100$$

where
A: Weight of silica of which surface is coated with rubber before the silica is ignited at high temperature
B: Weight of pure silica after silica of which surface is coated with rubber is ignited at high temperature

TABLE I

|  | EXAMPLE No. | | | | | COMPARATIVE EXAMPLE No. (by weight part) | | |
| --- | --- | --- | --- | --- | --- | --- | --- | --- |
|  | 1 | 2 | 3 | 4 | 5 | 1 | 2 | 3 |
| Amount of Rubber Coating | 11.8 | 29.6 | 26.6 | 27.1 | 25.7 | 0.1 | 0.2 | 0.3 |

In order to obtain test results showing the reaction products absorbed stress and shock energy in resin compositions for use in encapsulating semiconductor, and are low stress agents, the products were mixed according to Table (II), and test results are in Table (III).

TABLE (II)

| Combination | Sample No. | | | | | | | | (by weight part) |
| --- | --- | --- | --- | --- | --- | --- | --- | --- | --- |
|  | 1 | 2 | 3 | 4 | 5 | 6 | 7 | 8 | 9 |
| 1 Cresol novalc epoxy resin | 13 | 13 | 7 | 7 | 16 | 13 | 7 | 16 | 7 |
| 2 Phenol resin | 12 | 12 | 12 | 12 | 3 | 12 | 12 | 3 | 12 |
| Low stress agent from EXAMPLE 1 | 3 | — | — | — | — | — | — | — | — |
| Low stress agent from EXAMPLE 2 | — | 3 | — | — | — | — | — | — | — |
| Low stress agent from EXAMPLE 3 | — | — | 9 | — | — | — | — | — | — |
| Low stress agent from EXAMPLE 4 | — | — | — | 9 | — | — | — | — | — |
| Low stress agent | — | — | — | — | 9 | — | — | — | — |

TABLE (II)-continued

|  |  | (by weight part) Sample No. |  |  |  |  |  |  |  |  |
|---|---|---|---|---|---|---|---|---|---|---|
| Combination |  | 1 | 2 | 3 | 4 | 5 | 6 | 7 | 8 | 9 |
| from EXAMPLE 5 |  |  |  |  |  |  |  |  |  |  |
| Reaction product from COMPARATIVE EXAMPLE 1 |  | — | — | — | — | — | 3 | — | — | — |
| Reaction product from COMPARATIVE EXAMPLE 2 |  | — | — | — | — | — | — | 9 | — | — |
| Reaction product from COMPARATIVE EXAMPLE 3 |  | — | — | — | — | — | — | — | 9 | — |
| Reaction product from COMPARATIVE EXAMPLE 4 |  | — | — | — | — | — | — | — | — | 9 |
| Common Composition | Undecylic Imidazole | 0.45 |  |  |  |  |  |  |  |  |
|  | Carnauba Wax | 0.3 |  |  |  |  |  |  |  |  |
|  | Calcium Stearate | 0.15 |  |  |  |  |  |  |  |  |
|  | Acetylene Black | 0.15 |  |  |  |  |  |  |  |  |
|  | Furnace Black | 0.15 |  |  |  |  |  |  |  |  |
|  | $Sb_2O_3$ | 2 |  |  |  |  |  |  |  |  |
|  | Red Phosphorus | 2 |  |  |  |  |  |  |  |  |
|  | Silica | 60 |  |  |  |  |  |  |  |  |
|  | $CaCO_3$ | 8 |  |  |  |  |  |  |  |  |
|  | Brominated Epoxy Resin (EOCN 1020, Product of Nippon KaKaKu Co.) | 3 |  |  |  |  |  |  |  |  |

Remarks:
1 Quatex 3430, Product of Dow Chemical Co.
2 HRJ 2210, Product of Schenectady Co.

The materials formulated according to the Table II are mixed within a mixer and the mixture is blended in a two-roll mill preheated at 80° C. for 3 minutes, allowed to cool to normal temperature and ground into granular form to prepare a molding compound for semiconductor encapsulation.

The compositions for encapsulation materials prepared according to Table (II) are transfer-molded and encapsulated in 16-PIN DIP type IC frame having an island size of 4×6 mm at 170° C. at pressure of 75 Kg/cm$^2$, and then, are cured at 170° C. for hours to obtain semiconductor parts.

The results of samples compared for the properties such as the thermal impact property are shown in the Table (IV).

TABLE III

| Test Item |  | Sample No. |  |  |  |  |  |  |  |  |
|---|---|---|---|---|---|---|---|---|---|---|
|  |  | 1 | 2 | 3 | 4 | 5 | 6 | 7 | 8 | 9 |
| 1 | Spiral flow (inch) | 32 | 31 | 29 | 31 | 30 | 37 | 35 | 35 | 36 |
| 2 | Glass Transition Temperature (°C.) | 158 | 161 | 160 | 160 | 158 | 138 | 150 | 158 | 146 |
| 3 | Flexural Modulus (Kg/mm$^2$) | 1150 | 1100 | 1000 | 950 | 1100 | 1350 | 1450 | 1500 | 1400 |
| 4 | Flexural Strength (Kg/mm$^2$) | 980 | 1050 | 1100 | 1100 | 1050 | 830 | 870 | 870 | 900 |
| 5 | Stress (Kg/mm$^2$) | 0.52 | 0.38 | 0.30 | 0.25 | 0.32 | 0.86 | 0.91 | 0.95 | 0.80 |
| 6 | Moldability (times) | 600 | 650 | 650 | 850 | 800 | 150 | 100 | 200 | 150 |

Remarks:
1 Spiral flow: Measured on granular composition for semiconductor encapsulation at 170° C., 70 Kg/cm$^2$ for 2 minutes according to the method of EMMI-I-66.
2 Glass transition temperature: The temperature showing the varying gradient of linear expansion slope.
3 Measured according to JIS K 6911
4 Measured according to JIS K 6911
5 Stress: Measured by steel ring method; gauge is fixed on the inner wall of steel ring having inner diameter of 20 mm, thickness of 1 mm and height of 20 mm. Outer wall of steel ring is molded with the thickness of 10 mm at 170° C. and pressure of 75 Kg/cm$^2$. Then, after cooling to 25° C., the degree of deformation in steel is measured.
6 Moldability: Number of molding times capable of operation without cleaning when molding.

TABLE (IV)

| Test Item |  | No. of Encapsulated IC |  |  |  |  |  |  |  |  |
|---|---|---|---|---|---|---|---|---|---|---|
|  |  | 1 | 2 | 3 | 4 | 5 | 6 | 7 | 8 | 9 |
| i | Thermal Impact Test |  |  |  |  |  |  |  |  |  |
|  | 10 cycles | 0 | 0 | 0 | 0 | 0 | 40 | 10 | 20 | 20 |
|  | 50 cycles | 10 | 0 | 0 | 0 | 0 | 100 | 40 | 100 | 40 |
|  | 100 cycles | 20 | 10 | 5 | 0 | 0 | — | 100 | — | 100 |
| ii | P.C.T |  |  |  |  |  |  |  |  |  |
|  | 500 hours | 0 | 0 | 0 | 0 | 0 | 20 | 5 | 15 | 10 |
|  | 1000 hours | 5 | 0 | 0 | 0 | 0 | 40 | 20 | 30 | 20 |
|  | 2000 hours | 15 | 5 | 0 | 0 | 0 | 100 | 70 | 75 | 50 |

TABLE (IV)-continued

| Test Item | No. of Encapsulated IC | | | | | | | | |
|---|---|---|---|---|---|---|---|---|---|
| | 1 | 2 | 3 | 4 | 5 | 6 | 7 | 8 | 9 |
| iii bias P.C.T | | | | | | | | | |
| 50 hours | 0 | 0 | 0 | 0 | 0 | 10 | 5 | 30 | 7 |
| 100 hours | 10 | 5 | 0 | 0 | 0 | 55 | 30 | 100 | 50 |
| 150 hours | 30 | 15 | 5 | 0 | 2 | 85 | 80 | — | 80 |
| 200 hours | 50 | 30 | 10 | 3 | 7 | 100 | 100 | — | 100 |

Remarks:
i Thermal impact test:
Sample is immersed in solutions of −196° C. and 210° C. alternately for 30 seconds each of time. The ratio of crack occurence shows the number of chips which suffered cracks to the total of 50 IC chips by percentage.
ii Pressure Cooker Test:
Number of chips that the aluminium wire has been corroded among 50 chips at 121° C., relative humidity of 100%.
iii bias P.C.T:
Number of chips that the aluminium wire has been corroded among 50 chips, in which the voltage of DC 20 V is applied at 121° C., relative humidity of 100%.

What is claimed is:

1. A process for preparing a low stress agent for semiconductor encapsulants, which process comprises:
   (a) mixing 100 parts of inorganic filler, the surface of which is treated with a silane coupling agent, and 50 to 150 parts of a reactive liquid polymer while heating and stirring; and
   (b) reacting the resulting mixture with 5 to 20 parts of a silane-modified reactive liquid polymer which is modified with the silane coupling agent to cause the reactive liquid polymer to be coated on the inorganic filler.

2. The process of claim 1 wherein the surface treated inorganic filler is made by hydrolyzing the silane coupling agent in distilled water and then adding the inorganic filler thereto to place organic functional groups on the surface of said inorganic filler.

3. The process of claim 2 wherein the silane coupling agent is selected from the group consisting of mercapto silanes, amino silanes, epoxy silanes and vinyl silanes, and the inorganic filler is selected from the group consisting of clay, alumina trihydrate, amorphous silica, fused silica, hydrous clay, talc and mixtures thereof.

4. The process of claim 1 wherein the silane coupling agent has a moiety selected from the group consisting of vinyl, epoxy, amino and mercapto groups and the silane-modified reactive liquid polymer is made by reacting 40 parts of the silane coupling agent with 100 to 150 parts of a reactive liquid polymer containing a moiety selected from the group consisting of carboxy, amino and epoxy groups.

5. The process of claim 4 wherein the reactive liquid polymer is selected from the group consisting of butadiene and butadiene-acrylonitrile copolymers having a molecular weight of 1500 to 5000.

6. The process of claim 4 wherein 5 to 30 parts per 100 parts of the inorganic filler are coated with the reactive liquid polymer.

7. A process for preparing a low stress agent which comprises reacting (a) 175 to 650 parts of epoxy resin or 150 to 650 parts of phenol resin with (b) reaction products obtained by a process which comprises:
   (i) mixing 100 parts of inorganic filler, the surface of which is treated with a silane coupling agent, and 50 to 150 parts of a reactive liquid polymer while heating and stirring; and
   (ii) reacting the resulting mixture with 5 to 20 parts of a silane-modified reactive liquid polymer which is modified with the silane coupling agent to cause the reactive liquid polymer to be coated on the inorganic filler.

8. The process of claim 7 wherein the epoxy resin has an equivalent weight of 180 to 550 and a softening point of 35° to 110° C., said epoxy resin is selected from the group consisting of diglycidyl ether of bisphenol A, polyglycidyl ether of cresol formaldehyde novolac, polyglycidyl ether of phenol formaldehyde novolac, diglycidyl ether of hydrogenated bisphenol A, polyglycidyl ether of hydrogenated bisphenol A, and polyglycidyl ether of hydrogenated bisphenol formaldehyde novolac, and the phenol resin has a hydroxy equivalent value of 105 to 120 and a softening point of 80° to 110° C.

9. An epoxy resin composition for use in encapsulating a semiconductor, which comprises an epoxy resin, a curing agent, a filler, a catalyst and a low stress agent obtained by a process comprising:
   (a) mixing 100 parts of inorganic filler, the surface of which is treated with a silane coupling agent, and 50 to 150 parts of a reactive liquid polymer while heating and stirring; and
   (b) reacting the resulting mixture with 5 to 20 parts of a silane-modified reactive liquid polymer which is modified with the silane coupling agent to cause the reactive liquid polymer to be coated on the inorganic filler.

10. The epoxy resin composition of claim 9, wherein the low stress agent is included in an amount of 1 to 5 parts.

* * * * *